(12) United States Patent
Ohno et al.

(10) Patent No.: US 7,862,781 B2
(45) Date of Patent: Jan. 4, 2011

(54) HONEYCOMB STRUCTURE AND METHOD FOR MANUFACTURING HONEYCOMB STRUCTURE

(75) Inventors: Kazushige Ohno, Ibi-gun (JP); Masafumi Kunieda, Ibi-gun (JP); Shigeharu Ishikawa, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 345 days.

(21) Appl. No.: 12/047,845

(22) Filed: Mar. 13, 2008

(65) Prior Publication Data

US 2008/0236394 A1    Oct. 2, 2008

(30) Foreign Application Priority Data

Mar. 30, 2007    (JP)    ............... PCT/JP2007/057306

(51) Int. Cl.
*B01D 50/00* (2006.01)
*B01D 24/00* (2006.01)
*F01N 3/10* (2006.01)
*F01N 3/08* (2006.01)

(52) U.S. Cl. ................ 422/177; 55/522; 55/523; 55/524; 422/172; 422/173; 422/174; 422/175; 422/176; 422/178; 422/179; 422/180

(58) Field of Classification Search ........... 55/522–524; 422/172–180
See application file for complete search history.

(56) References Cited

U.S. PATENT DOCUMENTS 4,416,675 A * 11/1983 Montierth ............ 55/502
5,914,187 A    6/1999 Naruse et al.
6,656,564 B2 * 12/2003 Ichikawa et al. ............ 428/116
6,669,751 B1   12/2003 Ohno et al.
7,112,233 B2    9/2006 Ohno et al.
7,309,370 B2   12/2007 Kudo et al.
7,348,049 B2 *  3/2008 Yoshida ................ 428/116

(Continued)

FOREIGN PATENT DOCUMENTS

EP    1586547    10/2005

(Continued)

OTHER PUBLICATIONS

Korean Office Action for corresponding KR Application No. 10-2008-7024071, Sep. 1, 2010.

*Primary Examiner*—Walter D Griffin
*Assistant Examiner*—Amber Orlando
(74) *Attorney, Agent, or Firm*—Ditthavong Mori & Steiner, P.C.

(57) ABSTRACT

A honeycomb structure includes a ceramic block formed by a plurality of pillar-shaped honeycomb fired bodies each having a large number of cells longitudinally disposed in parallel with one another with a cell wall between the cells. The plurality of honeycomb fired bodies are combined with one another by interposing an adhesive layer with a sealing material layer formed on a peripheral face of the ceramic block and include a plurality of different shapes of the honeycomb fired bodies. A thickness of a peripheral wall forming the peripheral face of the ceramic block is virtually even. A shape of a cell located at an outermost periphery of the ceramic block is virtually identical with a shape of a cell located at a place other than the outermost periphery of the ceramic block. On the peripheral wall of the honeycomb fired body, a step is provided.

30 Claims, 9 Drawing Sheets

U.S. PATENT DOCUMENTS

| | | | |
|---|---|---|---|
| 7,517,502 B2* | 4/2009 | Ohno et al. | 422/177 |
| 7,585,471 B2* | 9/2009 | Oshimi | 422/180 |
| 7,641,955 B2* | 1/2010 | Ohno et al. | 428/116 |
| 2002/0038062 A1 | 3/2002 | Carmello et al. | |
| 2004/0161596 A1 | 8/2004 | Taoka et al. | |
| 2005/0011174 A1* | 1/2005 | Hong et al. | 55/523 |
| 2005/0109023 A1 | 5/2005 | Kudo et al. | |
| 2005/0153099 A1 | 7/2005 | Yamada | |
| 2005/0160710 A1 | 7/2005 | Taoka et al. | |
| 2005/0161849 A1 | 7/2005 | Ohno et al. | |
| 2005/0169819 A1 | 8/2005 | Shibata | |
| 2005/0175514 A1 | 8/2005 | Ohno | |
| 2005/0178098 A1 | 8/2005 | Ono et al. | |
| 2005/0180898 A1 | 8/2005 | Yamada | |
| 2005/0229565 A1 | 10/2005 | Yoshida | |
| 2005/0247038 A1 | 11/2005 | Takahashi | |
| 2005/0272602 A1 | 12/2005 | Ninomiya | |
| 2006/0021310 A1 | 2/2006 | Ohno et al. | |
| 2006/0051556 A1 | 3/2006 | Ohno et al. | |
| 2006/0068159 A1 | 3/2006 | Komori et al. | |
| 2006/0166820 A1 | 7/2006 | Ogyu et al. | |
| 2006/0177629 A1 | 8/2006 | Kunieda | |
| 2006/0194018 A1 | 8/2006 | Ohno et al. | |
| 2006/0210765 A1 | 9/2006 | Ohno et al. | |
| 2006/0213163 A1 | 9/2006 | Taoka et al. | |
| 2006/0216466 A1 | 9/2006 | Yoshida | |
| 2006/0216467 A1 | 9/2006 | Yoshida | |
| 2006/0222812 A1 | 10/2006 | Koyama et al. | |
| 2006/0225390 A1 | 10/2006 | Yoshida | |
| 2006/0228521 A1 | 10/2006 | Ohno et al. | |
| 2006/0230732 A1 | 10/2006 | Kunieda | |
| 2006/0254231 A1 | 11/2006 | Hayashi et al. | |
| 2007/0020155 A1 | 1/2007 | Ohno et al. | |
| 2007/0028575 A1 | 2/2007 | Ohno et al. | |
| 2007/0044444 A1 | 3/2007 | Oshimi | |
| 2007/0065348 A1 | 3/2007 | Ohno et al. | |
| 2007/0068128 A1 | 3/2007 | Oshimi et al. | |
| 2007/0116908 A1 | 5/2007 | Ohno et al. | |
| 2007/0126160 A1 | 6/2007 | Takahashi | |
| 2007/0128405 A1 | 6/2007 | Sakaguchi et al. | |
| 2007/0130897 A1 | 6/2007 | Sakaguchi et al. | |
| 2007/0169453 A1 | 7/2007 | Hayakawa | |
| 2007/0178275 A1 | 8/2007 | Takahashi | |
| 2007/0190289 A1 | 8/2007 | Fujita | |
| 2007/0190350 A1 | 8/2007 | Ohno et al. | |
| 2007/0196620 A1 | 8/2007 | Ohno et al. | |
| 2007/0204580 A1 | 9/2007 | Kunieda | |
| 2007/0212517 A1 | 9/2007 | Ohno et al. | |
| 2007/0293392 A1 | 12/2007 | Ohno et al. | |
| 2008/0083202 A1 | 4/2008 | Kunieda et al. | |
| 2008/0085394 A1* | 4/2008 | Ohno et al. | 428/117 |
| 2008/0202086 A1 | 8/2008 | Ohno et al. | |
| 2008/0202087 A1 | 8/2008 | Ohno et al. | |
| 2008/0203626 A1 | 8/2008 | Ohno et al. | |
| 2008/0236394 A1 | 10/2008 | Ohno et al. | |
| 2008/0237941 A1 | 10/2008 | Ohno et al. | |
| 2008/0241501 A1 | 10/2008 | Ohno et al. | |
| 2008/0286523 A1 | 11/2008 | Ohno et al. | |
| 2009/0011176 A1* | 1/2009 | Ichikawa | 428/116 |

FOREIGN PATENT DOCUMENTS

| | | |
|---|---|---|
| EP | 1623750 | 2/2006 |
| EP | 1857427 | 11/2007 |
| JP | 2004-154718 | 6/2004 |
| JP | 2005-125209 | 5/2005 |
| KR | 10-2006-0021912 | 3/2006 |
| WO | WO 2005/099865 | 10/2005 |
| WO | WO 2006/095835 | 9/2006 |

* cited by examiner

A-A line cross-sectional view

HONEYCOMB STRUCTURE AND METHOD FOR MANUFACTURING HONEYCOMB STRUCTURE

CROSS-REFERENCE TO RELATED APPLICATIONS

The present application claims priority under 35 U.S.C. §119 to PCT Application No. PCT/JP2007/057306, filed Mar. 30, 2007, the contents of which are incorporated herein by reference in their entirety.

BACKGROUND OF THE INVENTION

1. Field of the Invention

The present invention relates to a honeycomb structure and a method for manufacturing a honeycomb structure.

2. Discussion of the Background

In recent years, particulates (hereinafter, also referred to as PM) such as soot and other toxic components contained in exhaust gases discharged from internal combustion engines of vehicles such as buses and trucks, and construction machines have raised serious problems as contaminants harmful to the environment and the human body.

For this reason, various honeycomb structures made from porous ceramics have been proposed as honeycomb filters that capture PM in exhaust gases and purify the exhaust gases, and also as catalyst supporting carriers that allow exhaust gases to pass through the inside thereof to convert the exhaust gases.

As a honeycomb structure of this kind, a honeycomb structure manufactured by combining a plurality of honeycomb fired body is known, and in JP2004-154718A, a honeycomb structure formed by combining a plurality of kinds of honeycomb fired bodies having different shapes has been disclosed.

FIG. 1 is a perspective view schematically showing one example of the honeycomb structure manufactured by combining a plurality of kinds of honeycomb fired bodies having different shapes.

A honeycomb structure 300 shown in FIG. 1 is a honeycomb structure in which a plurality of honeycomb fired bodies 310, 320, and 330, having different shapes, are combined with one another by interposing an adhesive layer 301 to form a round pillar-shaped ceramic block 303 and a sealing material layer 302 is further formed on a peripheral face 304 of the ceramic block 303.

FIG. 2A is a perspective view schematically showing one example of a honeycomb fired body forming the honeycomb structure, and FIG. 2B is a cross-sectional view taken along line A-A of FIG. 2A.

A honeycomb fired body 330 is, out of honeycomb fired bodies forming the honeycomb structure, a virtually rectangular pillar-shaped honeycomb fired body placed inside the honeycomb structure.

In the honeycomb fired body 330, a large number of cells 331 are disposed in parallel with one another with a cell wall 333 therebetween in the longitudinal direction (the direction shown by an arrow a in FIG. 2A), and either one end of each of the cells 331 is sealed by plug material 332. Therefore, exhausted gases G flowing into one cell 331 with an opening on one end face are to be discharged from another cell 331 with an opening on the other end face after passing through a cell wall 333 between the cells 331.

Consequently, the cell wall 333 is allowed to function as a filter to capture PM and the like.

FIGS. 3A and 3B are perspective views schematically showing examples of a honeycomb fired body placed at an outermost periphery of the honeycomb structure, out of the honeycomb fired bodies forming the honeycomb structure.

In honeycomb fired bodies 310, 320 shown in FIGS. 3A and 3B, a plurality of cells 311, 321 are disposed in parallel with one another in the longitudinal direction, and cells 311, 321 are separated by cell walls 313, 323. Consequently, the cell walls 313, 323 of the honeycomb fired bodies 310, 320 are allowed to function as filters to capture PM and the like.

Here, shapes of the cells 311, 321 of the honeycomb fired bodies 310, 320 are all virtually quadrate shapes.

The cells 311, 321 of the honeycomb fired bodies 310, 320 are surrounded by outer walls 315, 325 and the cells are not exposed from a side face of the honeycomb fired bodies.

Further, out of the outer walls 315, 325 located outside the cells of the honeycomb fired bodies 310, 320 and not separating the cells, outer walls 316, 326, each of which is to be a peripheral face (see FIG. 1) of a ceramic block, form curved side faces.

In the present description, out of the outer walls forming side faces of the honeycomb fired bodies, an outer wall which is to be a peripheral face of the ceramic block is referred to as a peripheral wall.

Further, a cell in contact with the peripheral wall of the honeycomb fired body is referred to as a cell located at an outermost periphery.

A ceramic block 303 manufactured by placing the honeycomb fired bodies 310 and 320 at the outermost periphery has a smooth round pillar-shaped peripheral face 304. By forming a sealing material layer 302 on the peripheral face 304 of the ceramic block 303, the round pillar-shaped honeycomb structure 300 can be obtained.

The contents of JP2004-154718A are incorporated herein by reference in their entirety.

SUMMARY OF THE INVENTION

A honeycomb structure of the present invention includes a ceramic block formed by a plurality of pillar-shaped honeycomb fired bodies each having a large number of cells longitudinally disposed in parallel with one another with a cell wall between the cells. The plurality of pillar-shaped honeycomb fired bodies are combined with one another by interposing an adhesive layer, with a sealing material layer formed on a peripheral face of the ceramic block. The ceramic block includes a plurality of different shapes of the honeycomb fired bodies. Out of outer walls of the honeycomb fired bodies, a thickness of a peripheral wall forming the peripheral face of the ceramic block is virtually even. A shape of a cell located at an outermost periphery of the ceramic block is virtually identical with a shape of a cell located at a place other than the outermost periphery of the ceramic block, and on the peripheral wall of the honeycomb fired body, a step is provided.

A method for manufacturing a honeycomb structure of the present invention includes molding a ceramic material to manufacture a plurality of kinds of pillar-shaped honeycomb molded bodies each having a large number of cells longitudinally disposed in parallel with one another with a cell wall between the cells; firing the honeycomb molded bodies to manufacture honeycomb fired bodies; combining a plurality of kinds of the honeycomb fired bodies by interposing an adhesive paste to manufacture a ceramic block; and forming a sealing material layer on a peripheral face of the ceramic block.

In the molding treatment, a stepped honeycomb molded body is manufactured, the stepped honeycomb molded body having a cell located at an outermost periphery of the honeycomb molded body in a shape virtually identical with a shape of a cell located at a place other than the outermost periphery of the honeycomb molded body and an outer wall of a virtually even thickness. Thus, the stepped honeycomb molded body is provided with a step on a part of the outer wall.

In the firing treatment, the stepped honeycomb molded body is fired to manufacture a stepped honeycomb fired body.

In the combining treatment, the stepped honeycomb fired body is placed so that a stepped outer wall of the stepped honeycomb fired body becomes a peripheral face of the ceramic block, to manufacture a ceramic block provided with a step on the peripheral face.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
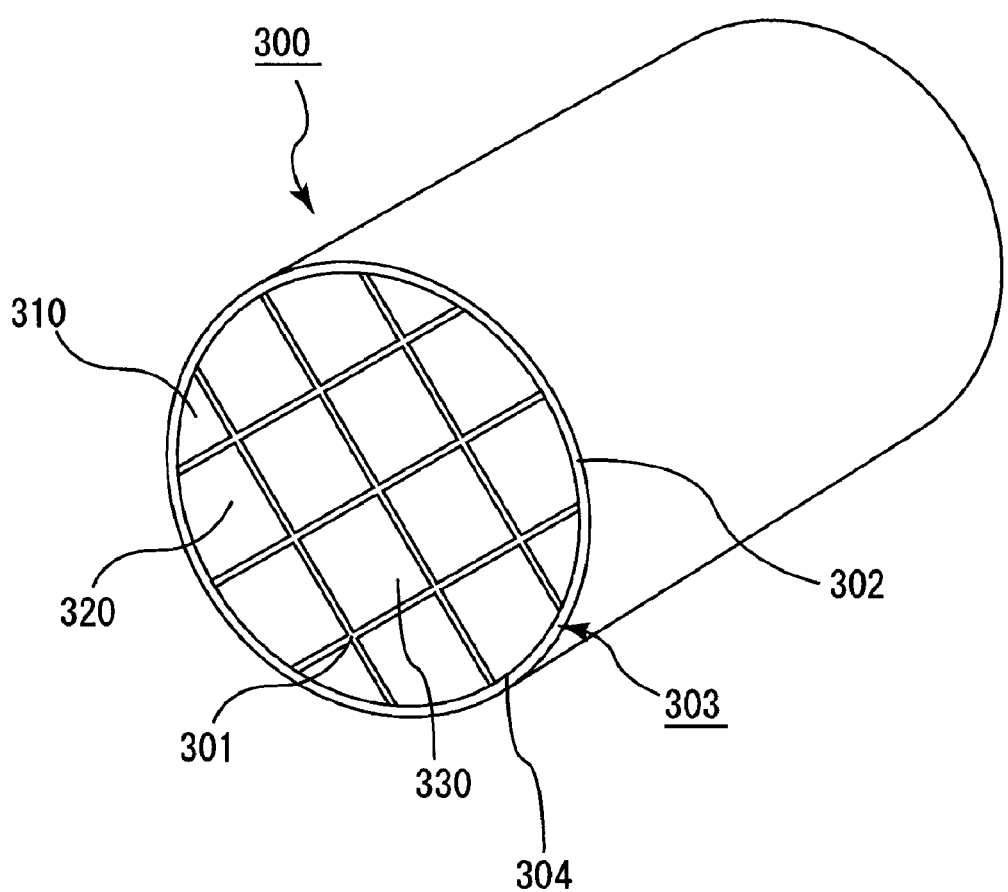
FIG. 1 is a perspective view schematically showing one example of the honeycomb structure manufactured by combining a plurality of kinds of honeycomb fired bodies having different shapes.
Figure 2A:
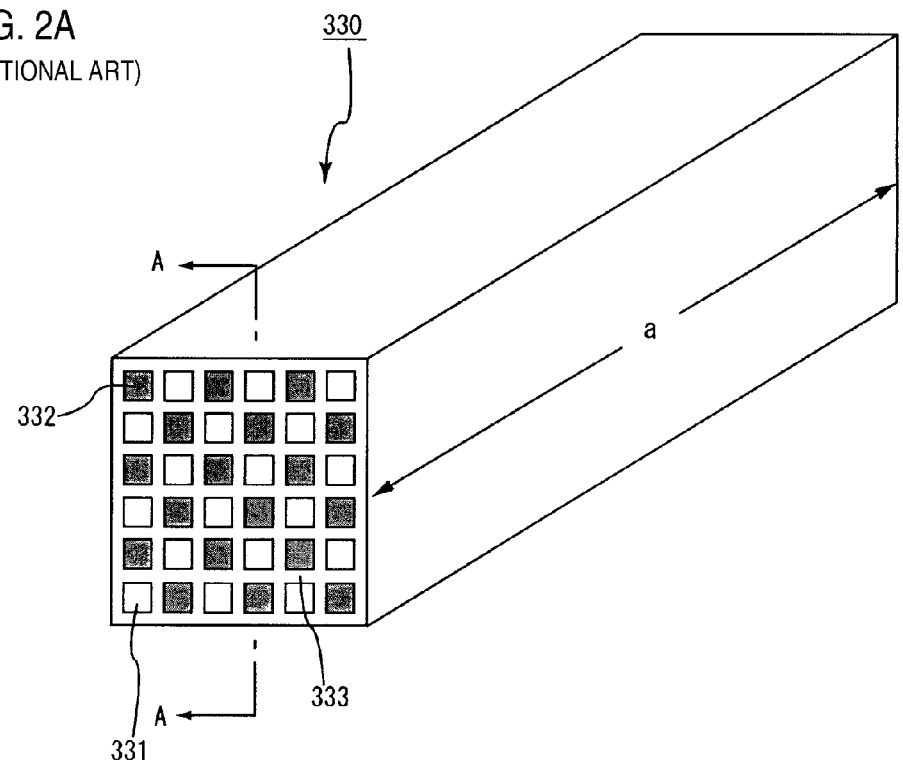
FIG. 2A is a perspective view schematically showing one example of the honeycomb fired body forming the conventional honeycomb structure.
Figure 2B:
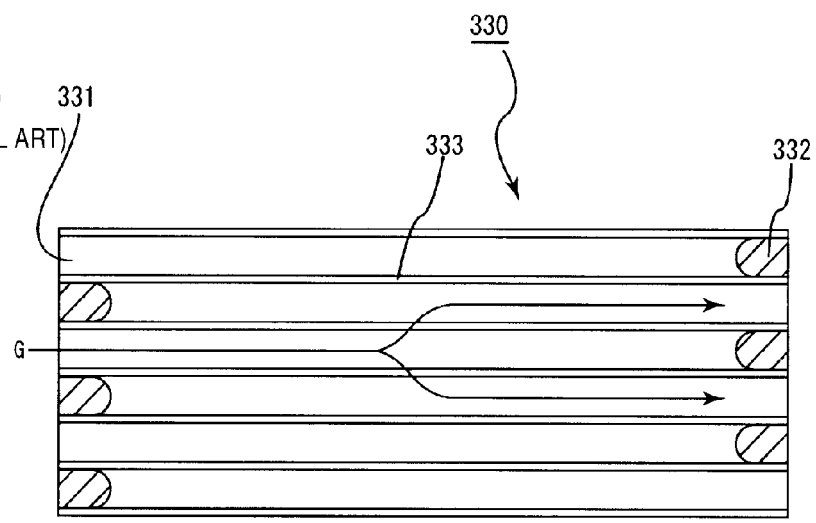
FIG. 2B is a cross-sectional view taken along line A-A of FIG. 2A.

The embodiments will now be described with reference to the accompanying drawings, wherein like reference numerals designate corresponding or identical elements throughout the various drawings.

A honeycomb structure of an embodiment of the present invention includes: a ceramic block formed by a plurality of pillar-shaped honeycomb fired bodies each having a large number of cells longitudinally disposed in parallel with one another with a cell wall between the cells and being combined with one another by interposing an adhesive layer, with a sealing material layer formed on a peripheral face of the ceramic block, wherein the ceramic block includes a plurality of kinds of the honeycomb fired bodies; out of outer walls of the honeycomb fired bodies, a thickness of a peripheral wall forming the peripheral face of the ceramic block is virtually even; a shape of a cell located at an outermost periphery of the ceramic block is virtually identical with a shape of a cell located at a place other than the outermost periphery of the ceramic block; and on the peripheral wall of the honeycomb fired body, a step is provided.

According to the honeycomb structure of the embodiment of the present invention, since a step is provided on the peripheral wall of the honeycomb fired body forming the peripheral face of the ceramic block, a step is provided on the peripheral face of the ceramic block. Therefore, an anchor effect is exerted on an adhesion of the peripheral face of the ceramic block to the sealing material layer forming the peripheral face. Consequently, in the honeycomb structure according to the embodiment of the present invention, a sealing material layer is less likely to peel from a ceramic block even used as an exhaust gas purifying filter or as a catalyst supporting carrier for a long time.

In the honeycomb structure of an embodiment of the present invention, either one end of each of the cells is sealed.

According to the honeycomb structure of the embodiment of the present invention, since either one end of each of the cells is sealed, the honeycomb structure tends to be suitably used as a filter.

In the honeycomb structure of an embodiment of the present invention, a shape of each of the cells is a rectangular shape. Further, in the honeycomb structure of an embodiment of the present invention, a shape of each of the cells includes two or more kinds of shapes. Furthermore, in the honeycomb structure of an embodiment of the present invention, the shape of each of the cells includes an octagonal shape and a rectangular shape, and the octagonal shaped cell and the rectangular shaped cell are placed alternately.

In the honeycomb structure of an embodiment of the present invention, the thickness of the peripheral wall of the honeycomb fired body is thicker than the thickness of the cell wall other than the peripheral wall of the honeycomb fired body.

In the honeycomb structure of the embodiment of the present invention, since the thickness of the peripheral wall of the honeycomb fired body is thicker than the thickness of the cell wall other than the peripheral wall of the honeycomb fired body, a honeycomb structure with a peripheral wall having a high strength tends to be obtained.

Figure 3A:
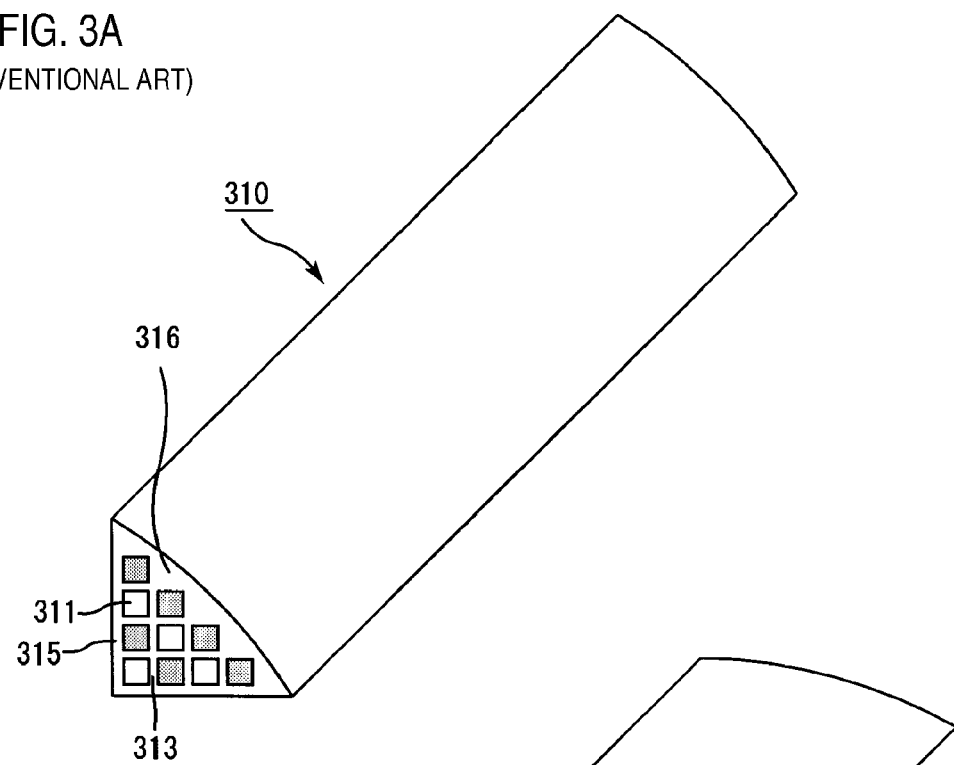
FIGS. 3A and 3B are perspective views each schematically showing one example of the honeycomb fired body located at the outermost periphery, out of the honeycomb fired bodies forming the conventional honeycomb structure.
Figure 3B:
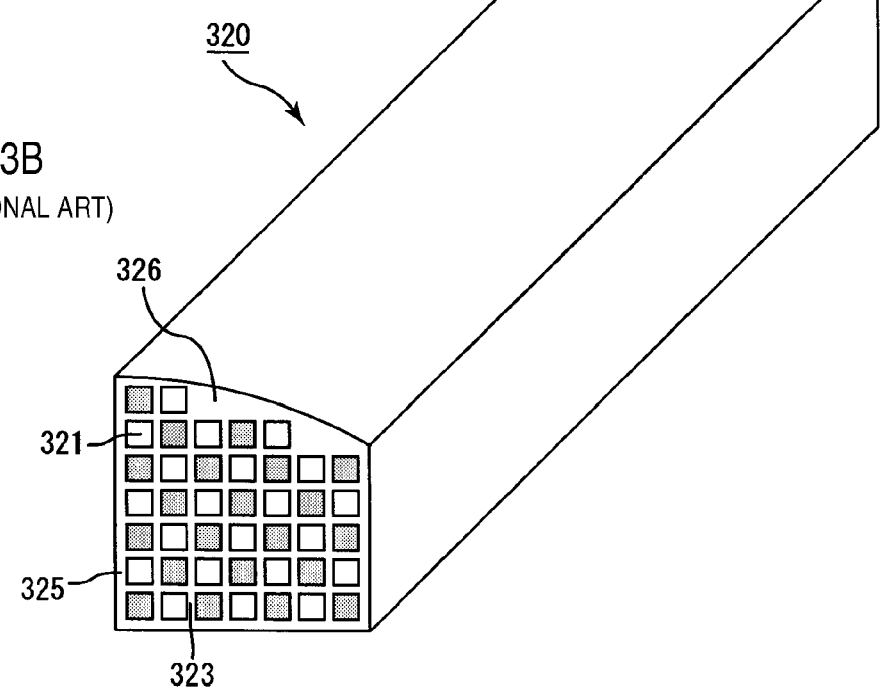

Further, a reason for a generation of a deformation on the peripheral wall during the molding of conventional honeycomb fired bodies shown in FIGS. 3A and 3B has been studied.

As a result, it was found out that a greater unevenness of the thickness of an outer wall of a honeycomb molded body causes a greater unevenness of a pressure on a wet mixture to be extruded during the extrusion-molding, and therefore, there generate a part with an excessive pressure and a part with a short pressure during the extrusion-molding.

Then, it was estimated that a greater unevenness of the pressure on the outer wall of the honeycomb molded body causes a deformation.

Based on this estimation, it was found that a honeycomb fired body without a deformation can be manufactured by uniforming the pressure on the outer wall of the honeycomb molded body.

Namely, a method for manufacturing a honeycomb structure of an embodiment of the present invention includes: molding a ceramic raw material to manufacture a plurality of kinds of pillar-shaped honeycomb molded bodies each having a large number of cells longitudinally disposed in parallel with one another with a cell wall between the cells; firing the honeycomb molded bodies to manufacture honeycomb fired bodies; combining a plurality of kinds of the honeycomb fired bodies by interposing an adhesive paste to manufacture a ceramic block; and forming a sealing material layer on a peripheral face of the ceramic block, wherein in the molding treatment, a stepped honeycomb molded body is manufactured, the stepped honeycomb molded body having a cell located at an outermost periphery of the honeycomb molded body in a shape virtually identical with a shape of a cell located at a place other than the outermost periphery of the honeycomb molded body and an outer wall of a virtually even thickness, and being provided with a step on a part of said outer wall; in the firing treatment, the stepped honeycomb molded body is fired to manufacture a stepped honeycomb fired body; and in the combining treatment, the stepped honeycomb fired body is placed so that a stepped outer wall of the stepped honeycomb fired body becomes a peripheral face of the ceramic block, to manufacture a ceramic block provided with a step on the peripheral face.

In the method for manufacturing a honeycomb structure of the embodiment of the present invention, it is estimated that since the thickness of the outer wall of the honeycomb molded body is virtually even, the unevenness of the pressure on the outer wall of the honeycomb molded body in the molding treatment becomes smaller.

Therefore, the honeycomb molded body tends not to be deformed in the molding treatment and a honeycomb fired body in a desired shape tends to be manufactured. Accordingly, a honeycomb structure without a deformation tends to be manufactured.

Here, in the present description, the thickness of the peripheral wall (outer wall) of the honeycomb fired body is defined as the length of a line segment perpendicular to an edge of the cell located at the outermost periphery, drawn from an outer edge of the cell toward the peripheral face on a cross section perpendicular to the longitudinal direction of the honeycomb fired body.

Figure 4A:
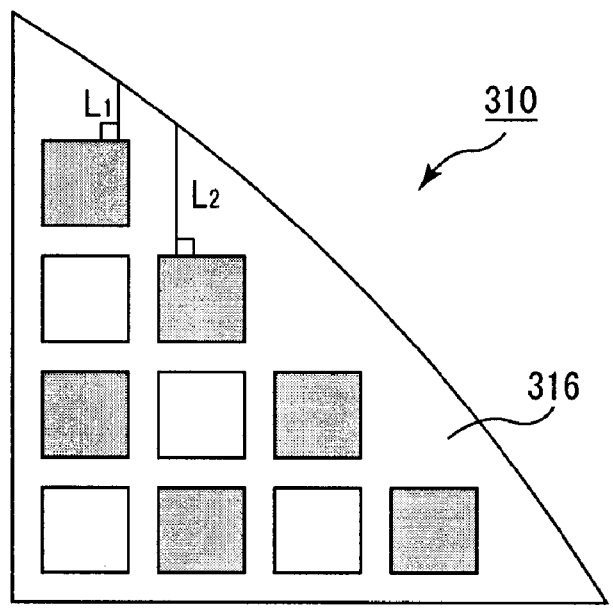
FIG. 4A is a side view showing one example of the thickness of the peripheral wall of the conventional honeycomb fired body.
Figure 4B:
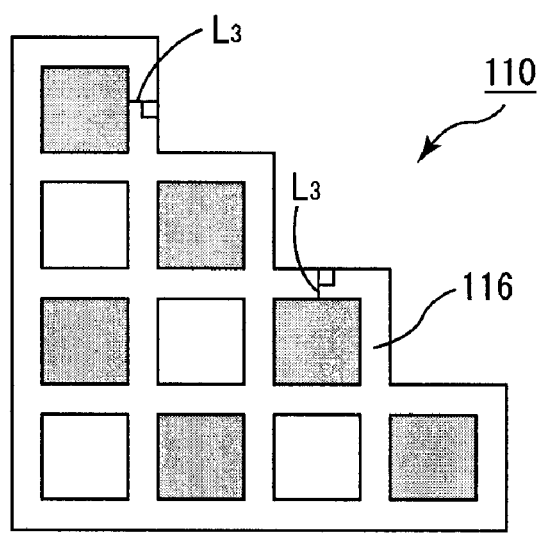
FIG. 4B is a side view showing one example of the thickness of the peripheral wall of the honeycomb fired body according to an embodiment of the present invention.

FIG. 4A is a side view showing one example of the thickness of the peripheral wall of the conventional honeycomb fired body. FIG. 4B is a side view showing one example of the thickness of the peripheral wall of the honeycomb fired body according to the present invention.

In the honeycomb fired body 310 shown in FIG. 4A, the thickness of the peripheral wall 316 is uneven, and there are provided a part indicated by L1 as an example of a part with a less-thick peripheral wall and a part indicated by L2 as an example of a part with a thicker peripheral wall.

On the other hand, in the honeycomb fired body 110 shown in FIG. 4B, the thickness of the peripheral wall 116 is the same as the thickness indicated by L3 at any part, that is, virtually even at any part.

Further, according to the method for manufacturing a honeycomb structure of the embodiment of the present invention, a ceramic block provided with a step on the peripheral face can be manufactured. Forming a sealing material layer by applying, drying, and solidifying the sealing material paste on the peripheral face of the ceramic block provided with a step on the peripheral face causes an anchor effect to work on an adhesion of the peripheral face of the ceramic block to the sealing material layer. Consequently, it may become easier to manufacture a honeycomb structure with a sealing material layer less likely to peel from a ceramic block even used as an exhaust gas purifying filter or as a catalyst supporting carrier for a long time.

Figure 5A:
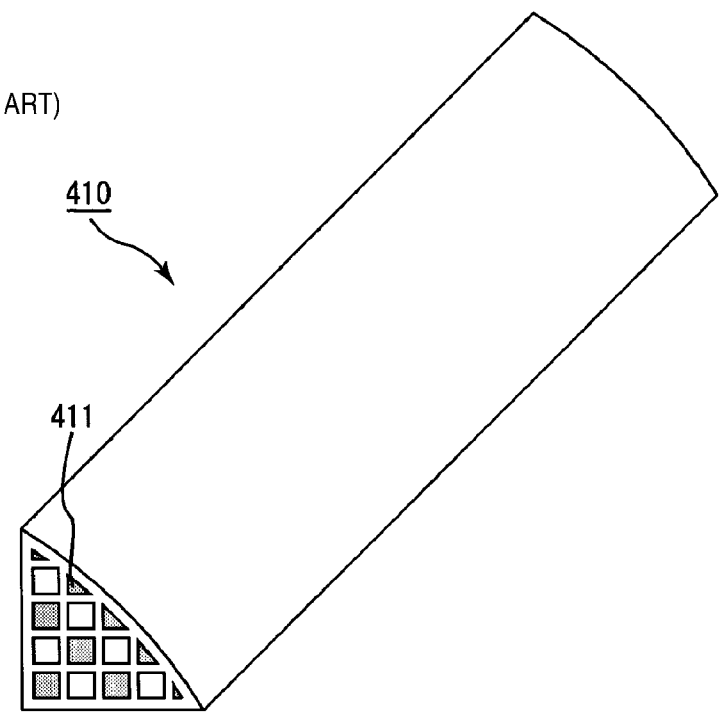
FIGS. 5A and 5B are perspective views each schematically showing another example of the honeycomb fired body located at the outermost periphery, out of the honeycomb fired bodies forming the conventional honeycomb structure.
Figure 5B:
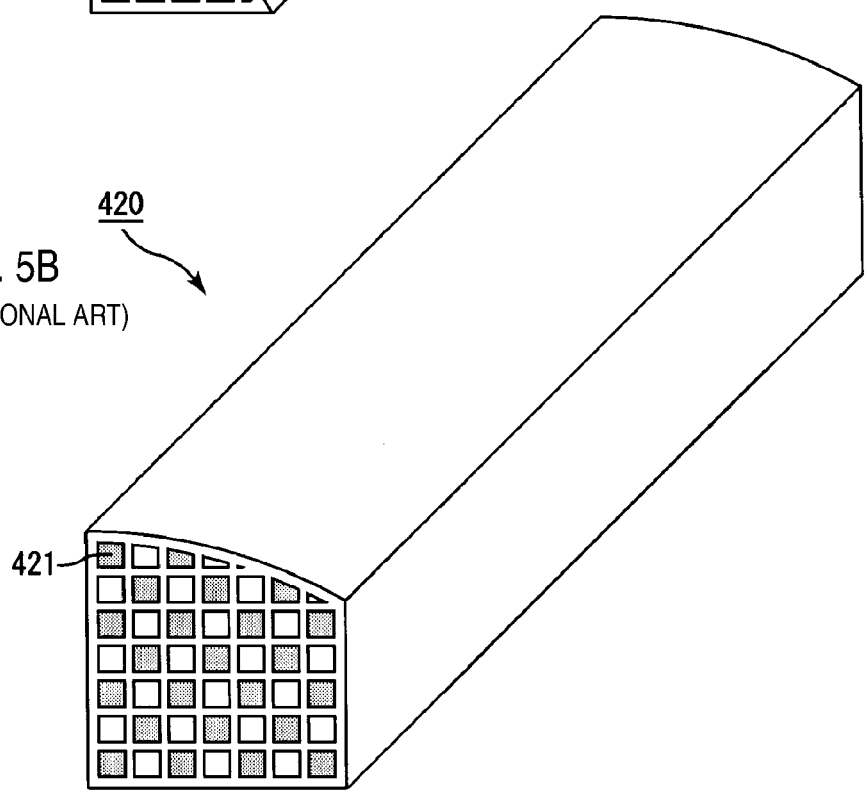

Subsequently, out of the honeycomb fired bodies used for manufacturing a conventional honeycomb structure, other examples of the honeycomb fired bodies located at the outermost periphery are schematically shown in FIGS. 5A and 5B.

In honeycomb fired bodies 410, 420 shown in FIGS. 5A and 5B, shapes of cells 411, 421 located at the closest position to a curved face forming the peripheral face of the ceramic block, are virtually triangular shapes or virtually trapezoidal shapes. One edge of each of the cells 411, 421 is formed along the curved face.

To use a honeycomb structure formed by a honeycomb fired body as an exhaust gas purifying filter, either one end of the cell of the honeycomb fired body needs to be sealed by a plug material. When sealing cells 411, 421 located at the outermost periphery of the honeycomb fired bodies 410, 420 as shown in FIGS. 5A and 5B, since an opening area of each of the cells is small, the plug material is hard to be filled thereto, and an overflow and a protrusion of the plug material tend to occur, namely, there is a case where a plugging of the cell is inadequate.

In the case of using a honeycomb structure formed by a honeycomb fired body with cells inadequately sealed as an exhaust gas purifying filter, there is a problem that a function as a filter is not carried out, since exhaust gases flowing into the honeycomb structure are discharged from the same cell without passing through the cell wall.

To solve such a problem, the method for manufacturing a honeycomb structure of an embodiment of the present invention further includes sealing either one end of each of the cells.

According to the method for manufacturing a honeycomb structure of the embodiment of the present invention, since the shape of the cell located at the outermost periphery of the honeycomb molded body is virtually identical with the shape of the cell located at a place other than the outermost periphery, an overflow and a protrusion of the plug material are less likely to occur in the cell located at the outermost periphery in the plugging treatment. Therefore, the plug material paste tends to be sufficiently injected into the cell located at the outermost periphery. Consequently, a honeycomb structure suitably used as a honeycomb filter tends to be manufactured.

Further, in the method for manufacturing a honeycomb structure of an embodiment of the present invention, a shape of each of the cells is a rectangular shape. Furthermore, in the method for manufacturing a honeycomb structure of an embodiment of the present invention, a shape of each of the cells includes two or more kinds of shapes. Moreover, in the method for manufacturing a honeycomb structure of an embodiment of the present invention, the shape of each of the cells includes an octagonal shape and a rectangular shape, and the octagonal shaped cell and the rectangular shaped cell are placed alternately.

In the method for manufacturing a honeycomb structure of an embodiment of the present invention, the thickness of the peripheral wall of the stepped honeycomb fired body is thicker than the thickness of a cell wall other than the peripheral wall of the honeycomb fired body.

According to the method for manufacturing a honeycomb structure of the embodiment of the present invention, since the thickness of the peripheral wall of the stepped honeycomb fired body is thicker than the thickness of a cell wall other than the peripheral wall of the honeycomb fired body, a honeycomb structure with a peripheral wall having a high strength tends to be manufactured.

However, when using the conventional honeycomb structure 300 such as a honeycomb structure shown in JP2004-154718A as an exhaust gas purifying filter or as a catalyst supporting carrier for a long time, there is a problem that the sealing material layer 302 peels from the ceramic block 303.

Further, a honeycomb fired body as shown in FIGS. 3A and 3B can be manufactured by extrusion-molding a ceramic material using an extrusion-molding machine to manufacture a honeycomb molded body and firing the resulting honeycomb molded body. However, a peripheral wall (a part to be the peripheral wall of the honeycomb fired body after firing) of the honeycomb molded body tends to be deformed during the extrusion-molding and there is a case where a deformed honeycomb fired body is obtained.

According to the embodiments of the present invention, it is possible to obtain a honeycomb structure with a sealing material layer less likely to peel from a ceramic block even used as an exhaust gas purifying filter or as a catalyst supporting carrier for a long time and less likely to be deformed during the molding, and a method for manufacturing such a honeycomb structure.

First Embodiment

The following description will discuss a first embodiment, which is one embodiment of the honeycomb structure of the present invention and the method for manufacturing the honeycomb structure of the present invention, with reference to drawings.

Figure 6:
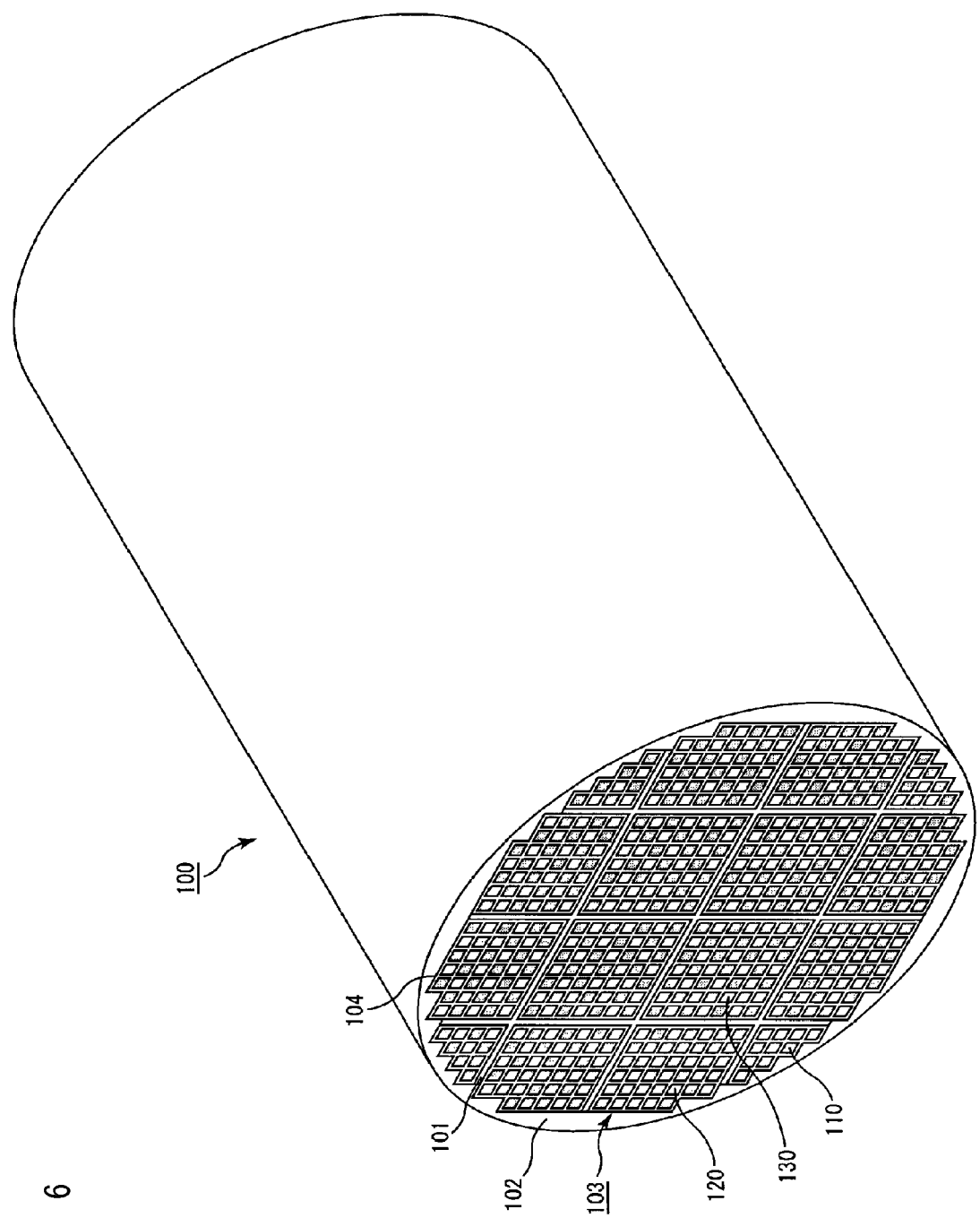
FIG. 6 is a perspective view schematically showing one example of the honeycomb structure of the first embodiment of the present invention.

FIG. 6 is a perspective view schematically showing one example of the honeycomb structure of the first embodiment of the present invention.

A honeycomb structure 100 of the embodiment of the present invention shown in FIG. 6 is made from a silicon carbide ceramic and includes four rectangular pillar-shaped honeycomb fired bodies 130 placed in the center, eight honeycomb fired bodies 120 placed so as to adjacently surround the honeycomb fired bodies 130, and four honeycomb fired bodies 110 placed adjacently to the honeycomb fired bodies 120. Each adjacent honeycomb fired bodies are combined by interposing an adhesive layer 101 to form a ceramic block 103, and a sealing material layer 102 is formed on a peripheral face 104 of the ceramic block 103.

An outermost periphery of the ceramic block 103 is a wall formed by combining a peripheral wall 116 (see FIG. 7A) of each of the honeycomb fired bodies 110 and a peripheral wall 126 (see FIG. 7B) of each of the honeycomb fired bodies 120.

Further, since a step is provided on the peripheral wall of each of the honeycomb fired bodies 110 and each of the honeycomb fired bodies 120, a step is provided on the peripheral face 104 of the ceramic block 103. The honeycomb structure 100 includes a sealing material layer 102 formed on the peripheral face 104 of the ceramic block 103.

Subsequently, the following description will discuss the honeycomb fired bodies 110, 120, and 130, which form the honeycomb structure 100 according to the present embodiment, with reference to drawings.

Figure 7:
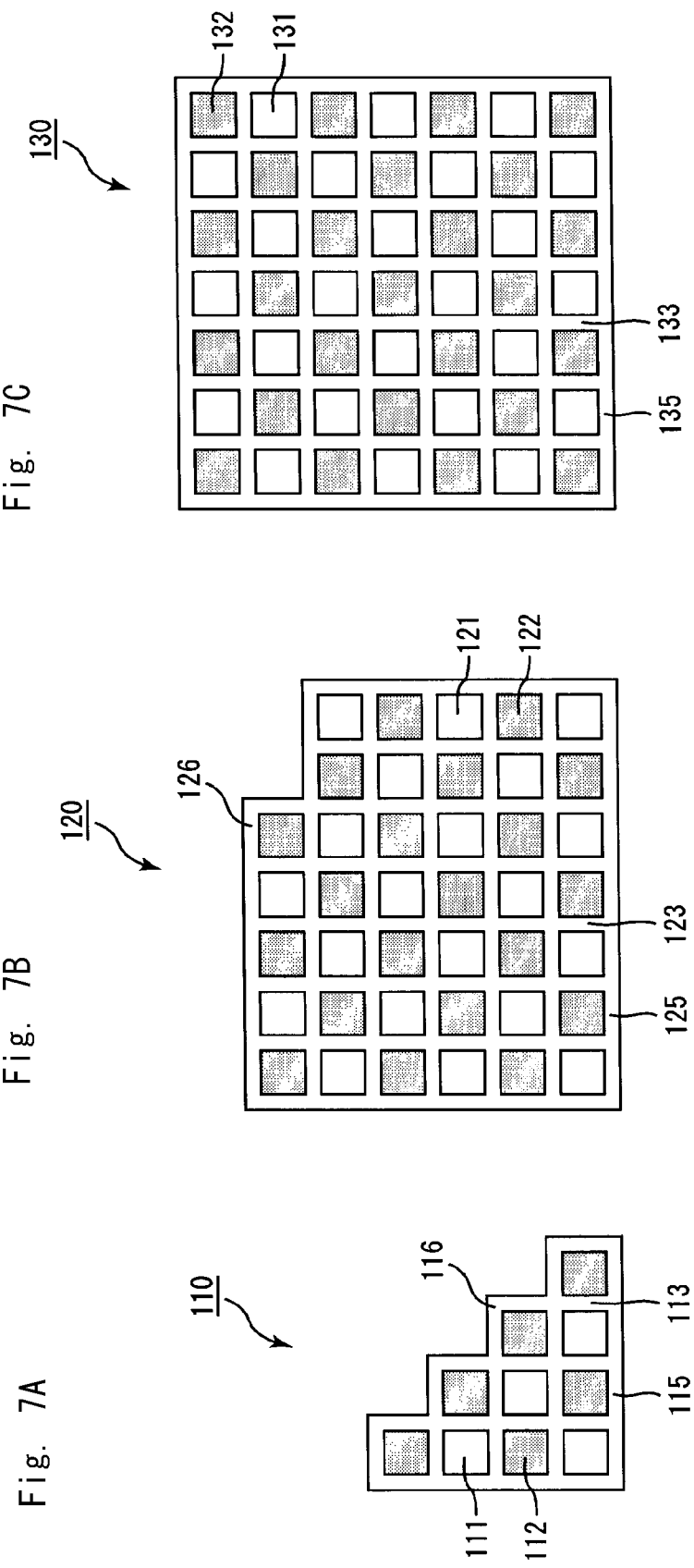
FIGS. 7A, 7B, and 7C are side views each schematically showing the honeycomb fired body forming the honeycomb structure of the first embodiment.

FIGS. 7A, 7B, and 7C are side views schematically showing the honeycomb fired bodies forming the honeycomb structure of the first embodiment.

In the honeycomb fired body 110 shown in FIG. 7A, a large number of cells 111 are longitudinally disposed in parallel with one another with a cell wall 113 therebetween and either one end of each of the cells 111 is sealed with a plug material 112. Therefore, the cell wall 113 is allowed to function as a filter.

Cross-sectional shape perpendicular to the longitudinal direction of the cells 111 of the honeycomb fired body 110 are all virtually quadrate shapes, and locations of the cells 111 are designed so that the cells 111 are disposed at even intervals. Further, the shape of the cell located at the outermost periphery is virtually identical with the shape of the cell located at a place other than the outermost periphery.

Furthermore, the thickness of a peripheral wall 116 is virtually even throughout the peripheral wall 116 and virtually identical with the thickness of a cell wall 113 and an other outer wall 115.

On the peripheral wall 116, a step corresponding to each of the locations of the cells 111 is provided.

Here, in the present description, a honeycomb fired body provided with a step on the peripheral wall is referred to as a stepped honeycomb fired body.

In the honeycomb fired body 120 shown in FIG. 7B too, a large number of cells 121 are longitudinally disposed in parallel with one another with a cell wall 123 therebetween and either one end of each of the cells 121 is sealed with a plug material 122. Therefore, the cell wall 123 is allowed to function as a filter in the same way as the honeycomb fired body 110.

Cross-sectional shape perpendicular to the longitudinal direction of the cells 121 of the honeycomb fired body 120 are all virtually quadrate shapes, and locations of the cells 121 are designed so that the cells 121 are disposed at even intervals. Further, the shape of the cell located at the outermost periphery is virtually identical with the shape of the cell located at a place other than the outermost periphery.

Furthermore, the thickness of a peripheral wall 126 is virtually even throughout the peripheral wall 126, and virtually identical with the thickness of a cell wall 123 and an other outer wall 125.

On the peripheral wall 126, since a step corresponding to each of the locations of the cells 121 is provided, the honeycomb fired body 120 is also a stepped honeycomb fired body.

In the honeycomb fired body 130 shown in FIG. 7C too, a large number of cells 131 are longitudinally disposed in parallel with one another with a cell wall 133 therebetween and either one end of each of the cells 131 is sealed with a plug material 132. Therefore, the cell wall 133 is allowed to function as a filter in the same way as the honeycomb fired body 110.

Cross-sectional shape perpendicular to the longitudinal direction of the cells 131 of the honeycomb fired body 130 are all virtually quadrate shapes, and locations of the cells 131 are designed so that the cells 131 are disposed at even intervals.

Here, since all outer walls 135 of the honeycomb fired body 130 do not form a peripheral face of the ceramic block, there is not provided a peripheral wall in the honeycomb fired body 130 and not provided a step on the outer walls 135.

The following description will discuss a method for manufacturing the honeycomb structure of the present embodiment.

First, a raw material composition including ceramic powder and a binder is extrusion-molded to manufacture a honeycomb molded body.

Since the honeycomb structure 100 includes three kinds of honeycomb fired bodies 110, 120, and 130, three kinds of honeycomb molded bodies are manufactured in the present treatment.

First, a mixed powder is prepared by dry mixing silicon carbide powder having different average particle diameters from each other as a ceramic material and an organic binder and a mixed liquid is prepared by mixing a liquid plasticizer, a lubricant, and water. Subsequently, the mixed powder and the mixed liquid are mixed using a wet mixer to prepare a wet mixture for manufacturing a honeycomb molded body.

Secondly, the wet mixture is charged into an extrusion-molding machine.

The wet mixture charged into the extrusion-molding machine is extrusion-molded into a honeycomb molded body in a predetermined shape.

At this time, a die of the extrusion-molding machine is selected so that the shape of the honeycomb molded body becomes virtually identical with the shape of the honeycomb fired body to be manufactured.

Accordingly, it is required to use three kinds of dies to manufacture a honeycomb structure of the present embodiment.

Next, the honeycomb molded body is cut into a predetermined length, and dried by using a microwave drying apparatus, a hot-air drying apparatus, a dielectric drying apparatus, a reduced-pressure drying apparatus, a vacuum drying apparatus, a frozen drying apparatus, or the like. Thereafter, by filling a plug material paste into a predetermined cell, the cell is sealed.

Here, as conditions to carry out cutting, drying, and sealing, conditions used for manufacturing a conventional honeycomb fired body can be used.

Subsequently, the honeycomb molded body is degreased in a degreasing furnace so as to heat organic substances contained in the honeycomb molded body. Then, the resulting honeycomb molded body is conveyed to a firing furnace and fired to manufacture a honeycomb fired body.

By carrying out the above treatments, three kinds of honeycomb fired bodies 110, 120, and 130 can be manufactured.

Here, as conditions to carry out degreasing and firing, conditions used for manufacturing a conventional honeycomb fired body can be used.

Subsequently, the honeycomb fired bodies manufactured by the above treatments are combined.

First, three kinds of honeycomb fired bodies are combined to form a honeycomb aggregated body having a predetermined size. Examples of the method for forming the honeycomb aggregated body include a method in which an adhesive paste layer is formed by applying an adhesive paste on a side face of each of the honeycomb fired body and the resulting honeycomb fired bodies are combined successively, a method in which each of the honeycomb fired bodies is temporally fixed in a molding frame having the virtually same shape as the shape of the ceramic block to be manufactured and an adhesive paste is injected into the each gap between the honeycomb fired bodies, and the like.

At this time, the honeycomb fired bodies are placed so that the peripheral walls of the honeycomb fired bodies 110 and the honeycomb fired bodies 120, which are stepped honeycomb fired bodies, become the peripheral face of the honeycomb aggregated body.

By placing the honeycomb fired bodies in this manner, the peripheral face of the honeycomb aggregated body becomes a face provided with a step.

Here, examples of the adhesive paste include a substance containing an inorganic binder, an organic binder, and at least one of inorganic fibers and inorganic particles.

Next, this honeycomb aggregated body is heated so that the adhesive paste layer is dried and solidified to form an adhesive layer and a ceramic block is manufactured, thereby completing the combining treatment.

Next, a sealing material layer is formed through applying a sealing material paste onto the periphery of the ceramic block and drying to solidify the sealing material paste.

Here, as a material included in the sealing material paste, the same material as the adhesive paste can be suitably used. Further, a different material as the adhesive paste may also be used.

By carrying out the above treatments, a round pillar-shaped honeycomb structure 100 provided with the sealing material layer on the periphery of the ceramic block formed by a plurality of honeycomb fired bodies adhered to one another by interposing an adhesive layer can be manufactured.

In the following, effects of the honeycomb structure of the present embodiment and the method for manufacturing the honeycomb structure of the present embodiment will be listed.

(1) In the honeycomb structure of the present embodiment, since a step is provided on the peripheral wall of the honeycomb fired body forming the peripheral face of the ceramic block, a step is provided on the peripheral face of the ceramic block. Further, a sealing material layer is formed on the peripheral face.

When a step is provided on the peripheral face of the ceramic block, an anchor effect tends to be allowed to work on adhesion between the peripheral face of the ceramic block and the sealing material layer. Therefore, in the honeycomb structure of the present embodiment, a sealing material layer is less likely to peel from the ceramic block even used as an exhaust gas purifying filter for a long time.

(2) Further, in the honeycomb structure of the present embodiment, since either one end of each of the cells is surely sealed, the honeycomb structure can be suitably used as a filter.

(3) In the method for manufacturing the honeycomb structure of the present embodiment, a ceramic block provided with a step on the peripheral face can be manufactured. When a sealing material layer is formed on the peripheral face of the ceramic block provided with a step on the peripheral face, an anchor effect tends to be allowed to work on adhesion between the peripheral face of the ceramic block and the sealing material layer. Therefore, it may become easier to manufacture a honeycomb structure with a sealing material layer less likely to peel from the ceramic block even used as an exhaust gas purifying filter for a long time.

(4) Further, in the method for manufacturing the honeycomb structure of the present embodiment, since the thickness of the outer wall of the honeycomb molded body is virtually even, the honeycomb molded body tends not to be deformed in the molding treatment, and a honeycomb fired body in a desired shape tends to be manufactured. Accordingly, a honeycomb structure without a deformation tends to be manufactured.

(5) Furthermore, in the method for manufacturing the honeycomb structure of the present embodiment, since the shape of the cell located at the outermost periphery of the honeycomb molded body is virtually identical with the shape of the cell located at a place other than the outermost periphery, an overflow and a protrusion of the plug material in the cell located at the outermost periphery in the plugging treatment is less likely to occur, and therefore, the plug material paste tends to be sufficiently injected into the cell located at the outermost periphery. Consequently, it may become easier to manufacture a honeycomb structure suitably used as a honeycomb filter.

EXAMPLES

The following shows Examples more specifically disclosing the first embodiment of the present invention. Moreover, the present invention is not limited only to these Examples.

Example 1

(Manufacture of Honeycomb Fired Body)

First, 52.8% by weight of silicon carbide coarse powder having an average particle diameter of 22 μm, 22.6% by weight of silicon carbide fine powder having an average particle diameter of 0.5 μm were wet-mixed, and to the obtained mixture were added and kneaded 2.1% by weight of acrylic resin, 4.6% by weight of an organic binder (methylcellulose), 2.8% by weight of a lubricant (UNILUB, manufactured by NOF Corp.), 1.3% by weight of glycerin, and 13.8% by weight of water to obtain a raw material composition.

After further kneaded, this raw material composition was extrusion-molded to respectively manufacture raw honeycomb molded bodies of the virtually same shapes as the honeycomb fired bodies 110, 120, and 130 shown in FIGS. 7A, 7B, and 7C.

Next, the raw honeycomb molded bodies were dried using the microwave drying apparatus to obtain dried honeycomb molded bodies, and then, a paste having the same composition as the composition of the raw molded body was injected to predetermined cells and the resulting honeycomb molded bodies were dried again using the microwave drying apparatus.

Subsequently, the dried honeycomb molded bodies were degreased at 400° C., and fired at 2200° C. in a normal-pressure argon atmosphere for 3 hours so that three kinds of honeycomb fired bodies each including a silicon carbide sintered body and having a porosity of 45%, an average pore diameter of 15 μm, the number of cells (cell density) of 300 pcs/inch2 (46.5 pcs/cm2), and a thickness of the cell wall of 0.25 mm were manufactured.

(Manufacture of Honeycomb Structure)

A honeycomb aggregated body was manufactured by adhering four honeycomb fired bodies 100, eight honeycomb fired bodies 120, and four honeycomb fired bodies 130 to one another by using a heat-resistant adhesive paste containing 30% by weight of alumina fibers having an average fiber length of 20 μm, 21% by weight of silicon carbide particles having an average particle size of 0.6 μm, 15% by weight of silica sol, 5.6% by weight of carboxy methylcellulose, and 28.4% by weight of water. At this time, honeycomb fired bodies were placed so that peripheral walls of honeycomb fired bodies 110 and 120 become a peripheral face of the honeycomb aggregated body.

Further, this honeycomb aggregated body was dried at 120° C. to manufacture a ceramic block with an adhesive layer having a thickness of 1.0 mm and a step provided on the peripheral face.

Next, a sealing material paste layer was formed on the peripheral portion of the ceramic block so as to fill the step on the peripheral face of the ceramic block by using a sealing material paste including the same material as the adhesive paste.

This sealing material paste layer was dried at 120° C. to be formed into a sealing material layer, and a round pillar-shaped honeycomb structure having a size of 143.8 mm in diameter× 150 mm in length was manufactured.

Comparative Example 1

A honeycomb structure was manufactured in the same manner as in Example 1, except that the honeycomb fired body 310 shown in FIG. 3A and the honeycomb fired body 320 shown in FIG. 3B were manufactured instead of the honeycomb fired body 110 shown in FIG. 7A and the honeycomb fired body 120 shown in FIG. 7B.

Comparative Example 2

A honeycomb structure was manufactured in the same manner as in Example 1, except that the honeycomb fired body 410 shown in FIG. 5A and the honeycomb fired body 420 shown in FIG. 5B were manufactured instead of the honeycomb fired body 110 shown in FIG. 7A and the honeycomb fired body 120 shown in FIG. 7B.

Evaluation on Easiness of Peeling of Sealing Material Layer

With respect to each of the honeycomb structures manufactured in Example and Comparative Examples, easiness of the peeling of the sealing material layer was evaluated.

As an apparatus for evaluating the adhesive strength, an apparatus including: a 2 L (liter) common-rail-type diesel engine; an exhaust-gas pipe connected to the honeycomb filter, which allows exhaust gases from the engine to pass through; and a honeycomb filter having a metal casing in which the honeycomb structure was housed, was used.

In this apparatus, the engine was driven at the number of revolutions of 2000 min-1 and a torque of 47 Nm so that exhaust gases from the engine were allowed to pass through each of the honeycomb structures, and 10 minutes of regenerating treatment of the honeycomb structures by using a post-injection system was conducted for every driving operation corresponding to a travel distance of 500 km. This was defined as one cycle.

After repeating this cycle 200 times, the state of the peeling of the sealing material layer from the peripheral face of the ceramic block was visually observed.

As a result, in the honeycomb structure manufactured in Example 1, the peeling of the sealing material layer from the peripheral face of the ceramic block did not occur.

On the other hand, in the honeycomb structures manufactured in comparative examples 1 and 2, the peeling of the sealing material layer from the peripheral face of the ceramic block occurred.

(Evaluation on Deformation and Sealing of Cell)

With respect to each of the honeycomb structures manufactured in Example and Comparative Examples, a degree of deformation on the peripheral face of the ceramic block was evaluated by the visual observation.

Further, with regard to the predetermined cells located at the outermost periphery of the ceramic block, whether or not either one end of each of the cells is favorably sealed is evaluated by the visual observation.

As a result, in the honeycomb structure manufactured in Example 1, deformation was not observed on the peripheral face of the ceramic block and the predetermined cells located at the outermost periphery of the ceramic block were all sealed.

On the other hand, in the honeycomb structure manufactured in Comparative Example 1, deformation was observed on the peripheral face of the ceramic block.

Further, in the honeycomb structure manufactured in Comparative Example 2, some of the predetermined cells located at the outermost periphery of the ceramic block were not sealed.

Second Embodiment

In the honeycomb structure of the first embodiment, the shape of the cells is all virtually quadrate shapes. However, in the honeycomb structure of the present invention, there may be placed two or more kinds of cells which have different cross-sectional shapes perpendicular to the longitudinal direction.

A honeycomb structure of a second embodiment is formed by three kinds of honeycomb fired bodies in the same manner as the honeycomb structure of the first embodiment, and has the same configuration as the configuration of the honeycomb structure of the first embodiment, except that the shapes of the cells are different.

Figure 8:
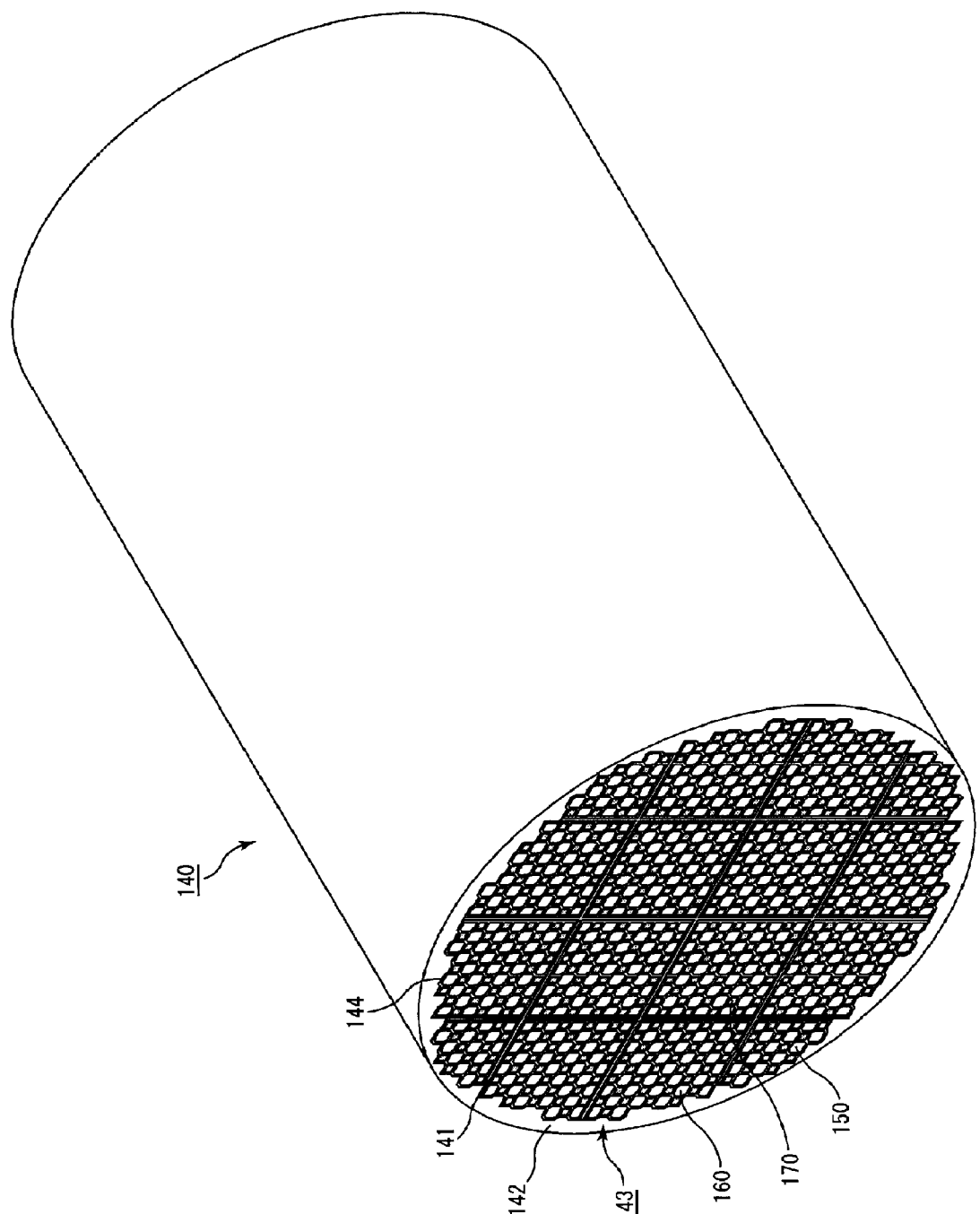
FIG. 8 is a perspective view schematically showing one example of the honeycomb structure of the second embodiment of the present invention.

FIG. 8 is a perspective view schematically showing one example of the honeycomb structure of the second embodiment of the present invention.

A honeycomb structure 140 according to the embodiment of the present invention shown in FIG. 8 includes four rectangular pillar-shaped honeycomb fired bodies 170 placed in the center, eight honeycomb fired bodies 160 placed so as to adjacently surround the honeycomb fired bodies 170, and four honeycomb fired bodies 150 placed adjacently to the honeycomb fired bodies 160. Each adjacent honeycomb fired bodies are combined by interposing an adhesive layer 141 to form a ceramic block 143, and a sealing material layer 142 is formed on the peripheral face 144 of the honeycomb block 143.

An outermost periphery of the ceramic block 143 is a wall formed by combining a peripheral wall 156 (see FIG. 9A) of each of the honeycomb fired bodies 150 and a peripheral wall 166 (see FIG. 9B) of each of the honeycomb fired bodies 160.

Further, since a step is provided on the peripheral wall of each of the honeycomb fired bodies 150 and each of the honeycomb fired bodies 160, a step is provided on the peripheral face 144 of the ceramic block 143. The honeycomb structure 140 includes a sealing material layer 142 formed on the peripheral face 144 of the ceramic block 143.

Subsequently, the following description will discuss the honeycomb fired bodies 150, 160, and 170, which form the honeycomb structure 140 according to the second embodiment.

Figure 9A:
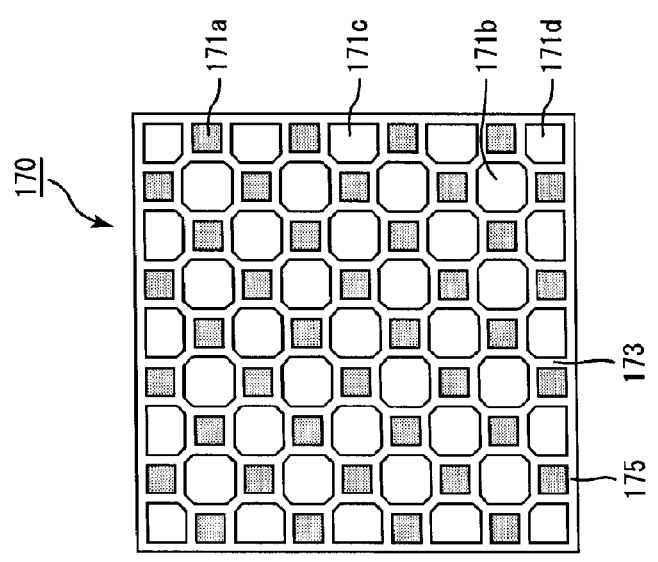
FIGS. 9A, 9B, and 9C are side views each schematically showing one example of the honeycomb fired body forming the honeycomb structure of the second embodiment.
Figure 9B:
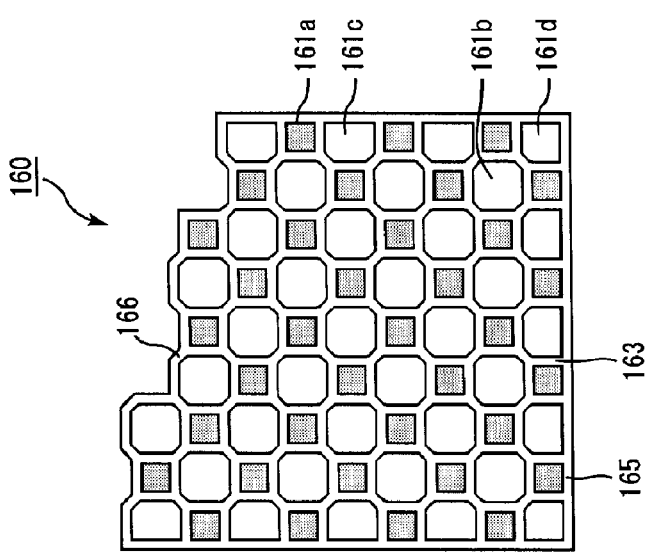
Figure 9C:
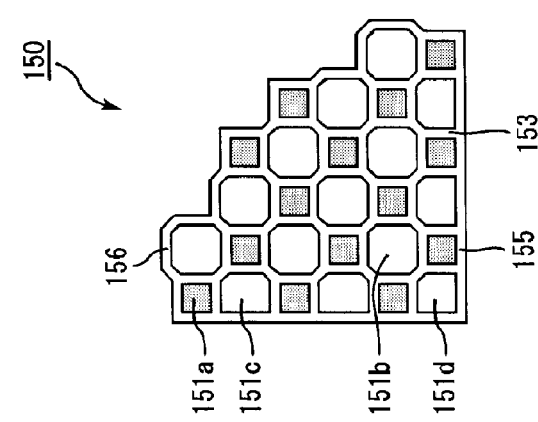

FIGS. 9A, 9B, and 9C are side views schematically showing examples of the honeycomb fired bodies forming the honeycomb structure of the second embodiment.

In the honeycomb fired body 150 shown in FIG. 9A, cells 151a and cells 151b are basically placed alternately. The cells 151a are cells each having a cross-sectional shape of virtually quadrate shape, and the cells 151b are cells each having a cross-sectional shape of virtually octagonal shape.

A cell 151c or a cell 151d is placed in a location to which a cell 151b is to be placed among cells adjacent to perpendicular or horizontal outer walls 155 in FIG. 9A.

Cross-sectional shape of the cell 151c is virtually hexagonal shape, that is, a part is cut out from the virtually octagonal shape of the cell 151b. Cross-sectional shape of the cell 151d is virtually pentagonal shape, that is, a part is cut out from the virtually hexagonal shape of the cell 151c. The cell 151c is placed to an edge part in the cross section of the honeycomb fired body 150, and the cell 151d is placed to an apex part in the cross section of the honeycomb fired body 150.

The cross-sectional shapes of the cell 151c and the cell 151d are designed so that the thickness of the outer wall 155 becomes virtually even.

Further, a peripheral wall 156 is formed along each edge of the cells 151a and the cells 151b, and the thickness of the peripheral wall 156 is virtually even throughout the peripheral wall 156. In addition, the thickness of the peripheral wall 156 is virtually identical with the thickness of a cell wall 153 and an other outer wall 155.

Moreover, since a step corresponding to each of the locations and shapes of the cells is provided on the peripheral wall 156, the honeycomb fired body 150 is a stepped honeycomb fired body.

Further, either one end of each of the cells is sealed in the honeycomb fired body 150. In the side face shown in FIG. 9A, ends of the cells 151a are sealed and ends of the other cells are not sealed. At this time, in the other side face which is not shown in FIG. 9A, the other ends of the cells 151a are not sealed and the other ends of the other cells are sealed.

In the honeycomb fired body 160 shown in FIG. 9B too, cells 161a, 161b, 161c, and 161d, which have the same shapes as the cells in the honeycomb fired body 150, are provided and the thickness of a peripheral wall 166 is virtually even throughout the peripheral wall 166. Further, the thickness of the peripheral wall 166 is virtually identical with the thickness of a cell wall 163 and an other outer wall 165.

Moreover, since a step corresponding to each of the locations and shapes of the cells is provided on the peripheral wall 166, the honeycomb fired body 160 is a stepped honeycomb fired body.

Furthermore, either one end of each of the cells is sealed in the same manner as in the honeycomb fired body 150.

In the honeycomb fired body 170 shown in FIG. 9C too, cells 171a, 171b, 171c, and 171d, which have the same shapes as the cells in the honeycomb fired bodies 150 and 160, are provided.

The thickness of a peripheral wall 175 is virtually identical with the thickness of a cell wall 173.

Here, since all outer walls 175 of the honeycomb fired body 170 do not form a peripheral face of the ceramic block, there is not provided a peripheral wall in the honeycomb fired body 170 and not provided a step on the outer walls 175.

Further, either one end of each of the cells is sealed in the same manner as in the honeycomb fired body 150.

A honeycomb structure formed by combining these honeycomb fired bodies can be manufactured in the same manner as the honeycomb structure in the first embodiment. Especially, to manufacture an above-mentioned honeycomb fired body, a die of the extrusion-molding machine is required to be selected so that the shape of the honeycomb molded body becomes virtually identical with the shape of the honeycomb fired body to be manufactured.

In the honeycomb structure according to the present embodiment and the method for manufacturing the honeycomb structure of the present embodiment too, the effects (1) to (5) of the first embodiment can be exerted.

Further, the following effect can be exerted.

(6) When using the honeycomb structure of the present embodiment as an exhaust gas purifying filter by placing the side having the end portions of the cells with relatively big opening area (for example, cell 151b in FIG. 9A) opened on an exhaust gas inlet side and placing the side having the end portions of the cells with relatively small opening area (for example, cell 151a in FIG. 9A) opened on an exhaust gas outlet side, filtration area becomes larger. Therefore, a deposition layer of captured PM tends to become thinner and an increase in a pressure loss at capturing PM tends to be suppressed.

Here, cells of the second embodiment include the cells having the cross-sectional shapes of virtually quadrate, virtually octagon, virtually hexagon, and virtually pentagon. However, most of the cells have cross-sectional shapes of virtually quadrate and virtually octagon. Therefore, the second embodiment is allowed to satisfy the condition of "the shape of each of the cells includes an octagonal shape and a rectangular shape, and the octagonal shaped cell and the rectangular shaped cell are placed alternately".

Third Embodiment

In the honeycomb structures of the first and the second embodiments, the thickness of each of the peripheral walls of the honeycomb fired bodies is virtually identical with the thickness of each of the cell walls, however, in a honeycomb structure of the present embodiment, the thickness of a peripheral wall of a honeycomb fired body is thicker than the thickness of a cell wall other than the peripheral wall.

In the present embodiment, the effects (1) to (5) of the first embodiment can be exerted, and further, the following effect can be exerted.

(7) In the honeycomb structure of the present embodiment, since the thickness of the honeycomb fired body is thicker than the thickness of the cell wall other than the peripheral wall, it may become easier to obtain a honeycomb structure with a peripheral wall having a high strength.

Fourth Embodiment

In the honeycomb structures of the first to the third embodiments, either end of each of the cells is sealed; however, in a honeycomb structure of the present embodiment, an end portion of each of cells is not sealed. In this case, a relation between a thickness of a peripheral wall and a thickness of a cell wall is not particularly limited, and the thickness of the peripheral wall of the honeycomb fired body may be thicker than the thickness of the cell wall other than the peripheral wall of the honeycomb fired body.

Since the end portion of each of the cells is not sealed, the honeycomb structure of the present embodiment can be suitably used as a catalyst supporting carrier.

Therefore, in the honeycomb structure of the present embodiment, and in the functional effects (1) and (3) of the first embodiment, a sealing material layer tends not to be peeled from the ceramic block when used as a catalyst supporting carrier for a long time.

Further, the effect (4) of the first embodiment can be exerted too.

Other Embodiments

The shape of the honeycomb structure of the embodiments of the present invention is not limited to the round pillar-shape, but may be an optional pillar shape, such as cylindroid shape and polygonal pillar shape.

A porosity of the honeycomb fired body forming the honeycomb structure of the embodiments of the present invention is not particularly limited, however, desirably at least about 35% and at most about 60%.

The porosity of 35% or more tends not to cause clogging in the honeycomb structure according to the embodiment of the present invention; in contrast, the porosity of 60% or less tends not to cause a reduction in the strength of the honeycomb fired body, and tends not to result in damage therein.

An average pore diameter of the honeycomb fired body is desirably at least about 5 μm and at most about 30 μm.

The average pore diameter of 5 μm or more tends not to cause clogging of particulates; in contrast, the average pore diameter of 30 μm or less tends not to surely cause particulates to pass through the pores, and it may become easier to capture the particulates and it becomes possible to function as a filter.

Here, the porosity and the pore diameter can be measured by the conventionally known methods such as a mercury penetration method, Archimedes method, and a measuring method using a scanning electron microscope (SEM).

The thickness of the cell wall of the honeycomb structure of the embodiments of the present invention is not particularly limited, however, desirably at least about 0.2 mm and at most about 0.4 mm.

The thickness of the cell wall of 0.2 mm or more tends not to cause the thickness of the cell walls supporting the honeycomb structure to become too thin, it may become easier to maintain the strength of the honeycomb structure; in contrast, the thickness of 0.4 mm or less tends not to cause an increase in the pressure loss.

Further, the thickness of the outer wall (peripheral wall) included in the honeycomb fired body forming the honeycomb structure of the embodiments of the present invention is not particularly limited, however, desirably at least about 0.2 mm and at most about 0.4 mm as in the case of the thickness of the cell wall.

Further, the sealing material layer is desirably formed so that the step on the peripheral wall can be filled. In a case where a protruded portion among the step on the peripheral wall protrudes through the surface of the sealing material layer, an installation may be interrupted on installing the honeycomb structure in an exhaust gas purifying apparatus.

Moreover, a cell density on a cross section perpendicular to the longitudinal direction of the honeycomb structure is not particularly limited, and a preferable lower limit is about 31.0 pcs/cm2 (about 200 pcs/in2), a preferable upper limit is about 93 pcs/cm2 (about 600 pcs/in2), a more preferable lower limit is about 38.8 pcs/cm2 (about 250 pcs/in2), and a more preferable upper limit is about 77.5 pcs/cm2 (about 500 pcs/in2).

The main component of the constituent material of the honeycomb structure is not limited to silicon carbide, and other examples of ceramic materials include ceramic powder, for example, nitride ceramics such as aluminum nitride, silicon nitride, boron nitride, and titanium nitride; carbide ceramics such as zirconium carbide, titanium carbide, tantalum carbide, and tungsten carbide; and oxide ceramics such as alumina, zirconia, cordierite, mullite, and aluminum titanate, and the like.

Out of these components, non-oxide ceramics are preferable, and silicon carbide is more preferable because this is excellent in thermal resistance properties, mechanical strength, thermal conductivity and the like. Moreover, examples of the constituent material of the honeycomb structure also include silicon-containing ceramics, in which metallic silicon is blended with the above described ceramics, as well as a ceramic material such as ceramic bound by silicon or silicate compounds. And out of these, those ceramics (silicon-containing silicon carbide) in which metallic silicon is blended with silicon carbide are preferably used.

Especially, a silicon-containing silicon carbide ceramic containing about 60 wt % or more of silicon carbide is preferable.

The particle diameter of the ceramic powder is not particularly limited, and the ceramic powder that tends not to cause the case where the size of the honeycomb fired body manufactured by the following firing treatment becomes smaller than that of the honeycomb molded body after degreased is preferable. A powder having a combination of 100 parts by weight of powder having an average particle diameter of at least about 1.0 μm and at most about 50 μm, and at least about 5 parts by weight and at most about 65 parts by weight of powder having an average particle diameter of at least about 0.1 μm and at most about 1.0 μm is preferable.

In order to adjust the pore diameter and the like of the honeycomb fired body, it is necessary to adjust the firing temperature. However, it is also possible to adjust the pore diameter by adjusting the particle diameter of the ceramic powder.

The organic binder in the wet mixture is not particularly limited, and examples thereof include methylcellulose, carboxy methylcellulose, hydroxy ethylcellulose, polyethylene glycol, and the like. Methylcellulose is desirable among these. A blending amount of the organic binder is desirably at least about 1 part by weight and at most about 10 parts by weight with respect to 100 parts by weight of ceramic powder.

The plasticizer in the wet mixture is not particularly limited, and examples thereof include glycerin and the like. The lubricant is not particularly limited, and examples thereof include polyoxyalkylene-based compounds such as polyoxyethylene alkyl ether and polyoxypropylene alkyl ether, and the like.

Specific examples of the lubricant include polyoxyethylene monobutyl ether, polyoxypropylene monobutyl ether, and the like.

Moreover, the plasticizer and the lubricant may not be contained in the wet mixture in some cases.

In addition, a dispersant solution may be used upon preparing a wet mixture, and examples of the dispersant solution include water, an organic solvent such as benzene, alcohol such as methanol, and the like.

Furthermore, a molding aid may be added to the wet mixture.

The molding aid is not particularly limited, and examples thereof include ethylene glycol, dextrin, fatty acid, fatty acid soap, polyalcohol and the like.

Furthermore, a pore-forming agent such as balloons that are fine hollow spheres including oxide-based ceramics, spherical acrylic particles, graphite and the like may be added to the wet mixture, if necessary.

The balloon is not particularly limited, and examples thereof include alumina balloon, glass micro balloon, shirasu balloon, fly ash balloon (FA balloon), mullite balloon and the like. Alumina balloon is desirable among these.

The plug material paste for sealing the cells is not particularly limited, a plug to be manufactured through the subsequent processes desirably has a porosity of at least about 30% and at most about 75%, and for example, it is possible to use a plug material paste having the same composition as that of the wet mixture of the raw material.

Examples of the inorganic binder in the adhesive paste and the sealing material paste include silica sol, alumina sol, and the like. Each of these materials may be used alone, or two or more kinds of these may be used in combination. Silica sol is desirable among the inorganic binders.

Examples of the organic binder in the adhesive paste and the sealing material paste include polyvinyl alcohol, methyl cellulose, ethyl cellulose, carboxymethyl cellulose, and the like. Each of these may be used alone or two or more kinds of these may be used in combination. Carboxymethyl cellulose is desirable among the organic binders.

Examples of the inorganic fibers in the adhesive paste and the sealing material paste include ceramic fibers and the like such as silica-alumina, mullite, alumina, and silica. Each of these may be used alone or two or more kinds of these may be used in combination. Alumina fibers are desirable among the inorganic fibers.

Examples of the inorganic particles in the adhesive paste and the sealing material paste include carbides, nitrides, and the like, and specific examples thereof include inorganic powder or the like made from silicon carbide, silicon nitride, boron nitride and the like. Each of these may be used alone, or two or more kinds of these may be used in combination. Out of the inorganic particles, silicon carbide is desirably used due to its superior thermal conductivity.

Moreover, a pore-forming agent such as balloons that are fine hollow spheres including oxide-based ceramics, spherical acrylic particles, graphite and the like may be added to the adhesive paste and the sealing material paste, if necessary. The balloons are not particularly limited, and examples thereof include alumina balloons, glass micro-balloons, shirasu balloons, fly ash balloons (FA balloons), mullite balloons, and the like. Alumina balloons are more desirably used among these.

A catalyst may be supported on the honeycomb structure of the embodiments of the present invention.

In the honeycomb structure of the embodiments of the present invention, by supporting a catalyst capable of converting toxic gas components in exhaust gases, such as CO, HC, and NO, it becomes possible to convert the toxic gas components in the exhaust gases by catalytic reaction. Further, by supporting a catalyst which assists burning of PM, it becomes possible to burn and remove PM more easily.

A catalyst may be supported either on the honeycomb structure or on a honeycomb fired body before manufacturing a honeycomb aggregated body.

In the case where a catalyst is supported, desirably, an alumina film layer having a high specific surface area is formed on the surface of the honeycomb structure, and a co-catalyst and a catalyst such as platinum are applied onto the surface of the alumina film (layer).

Examples of the method for forming the alumina film on the surface of the honeycomb structure include a method in which the honeycomb structure is impregnated with a solution of a metal compound containing aluminum such as Al(NO3)3 and then heated, a method in which the honeycomb structure is impregnated with a solution containing alumina powder and then heated, and the like.

Examples of the method for applying a co-catalyst to the alumina film include a method in which the honeycomb structure is impregnated with a solution of a metal compound containing a rare-earth element such as Ce(NO3)3 and then heated, and the like.

Examples of the method for applying a catalyst to the alumina film include a method in which the honeycomb structure is impregnated with a solution of diamine dinitro platinum nitric acid ([Pt(NH3)2(NO2)2]HNO3, platinum concentration: about 4.53% by weight) and the like and then heated, and the like.

In addition, a catalyst may be applied by a method in which, after preceding application of a catalyst to alumina particles, the honeycomb structure is impregnated with a solution containing alumina powder with the catalyst applied thereto, and then heated.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb structure comprising: a ceramic block formed by a plurality of pillar-shaped honeycomb fired bodies each having a large number of cells longitudinally disposed in parallel with one another with a cell wall between the cells, the plurality of pillar-shaped honeycomb fired bodies being combined with one another by interposing an adhesive layer, with a sealing material layer formed directly on a peripheral face of said ceramic block, wherein
said ceramic block includes a plurality of different shapes of said honeycomb fired bodies;
out of outer walls of said honeycomb fired bodies, a thickness of a peripheral wall forming the peripheral face of said ceramic block is virtually even;
a shape of a cell located at an outermost periphery of said ceramic block is virtually identical with a shape of a cell located at a place other than said outermost periphery of said ceramic block;
on said peripheral wall of said honeycomb fired body, a step is provided:
a surface of said sealing material layer is smooth; and
said sealing material layer does not have an irregularity formed on an outer peripheral face thereof.

2. The honeycomb structure according to claim 1, wherein
either one end of each of said cells is sealed.

3. The honeycomb structure according to claim 1, wherein
a shape of each of said cells is a rectangular shape.

4. The honeycomb structure according to claim 1, wherein
a shape of each of said cells includes one of two or more kinds of shapes.

5. The honeycomb structure according to claim 4, wherein
the shape of each of said cells includes one of an octagonal shape and a rectangular shape, and the octagonal shaped cell and the rectangular shaped cell are placed alternately.

6. The honeycomb structure according to claim 1, wherein
the thickness of said peripheral wall of said honeycomb fired body is thicker than the thickness of the cell wall other than said peripheral wall of said honeycomb fired body.

7. The honeycomb structure according to claim 1, wherein
said ceramic block is formed by three different shapes of honeycomb fired bodies.

8. The honeycomb structure according to claim 1, wherein
the cells in said honeycomb fired bodies include: a cell having a cross-sectional shape of virtually hexagonal shape formed by cutting out a part from a virtually octagonal shape; and a cell having a cross-sectional shape of virtually pentagonal shape formed by cutting out a part from the cell having a cross-sectional shape of virtually hexagonal shape,
the virtually hexagonal-shaped cell being placed to an edge part in the cross section of each of said honeycomb fired bodies, and
the virtually pentagonal-shaped cell being placed to an apex part in the cross section of each of said honeycomb fired bodies.

9. The honeycomb structure according to claim 1, wherein
the cells of said honeycomb fired bodies include cells having cross-sectional shapes of virtually quadrate, virtually octagon, virtually hexagon, and virtually pentagon.

10. The honeycomb structure according to claim 1, wherein
an end portion of each of said cells is not sealed.

11. The honeycomb structure according to claim 1, wherein
the thickness of said cell wall is at least about 0.2 mm and at most about 0.4 mm.

12. The honeycomb structure according to claim 1, wherein
the thickness of the outer wall included in each of said honeycomb fired bodies is at least about 0.2 mm and at most about 0.4 mm.

13. The honeycomb structure according to claim 1, wherein
said sealing material layer is formed so that the step on said peripheral wall is filled with said sealing material layer.

14. The honeycomb structure according to claim 1, wherein
a main component of a constituent material of said honeycomb fired bodies comprises silicon carbide or silicon-containing silicon carbide.

15. The honeycomb structure according to claim 1, wherein
a catalyst is supported on the honeycomb structure.

16. The honeycomb structure according to claim 1, wherein
the honeycomb structure is configured to have end portions of the cells with relatively big opening area to be opened on an exhaust gas inlet side and end portions of the cells with relatively small opening area to be opened on an exhaust gas outlet side.

17. A method for manufacturing a honeycomb structure, said method comprising: molding a ceramic material to manufacture a plurality of kinds of pillar-shaped honeycomb molded bodies each having a large number of cells longitudinally disposed in parallel with one another with a cell wall between the cells;
firing said honeycomb molded bodies to manufacture honeycomb fired bodies;
combining a plurality of kinds of said honeycomb fired bodies by interposing an adhesive paste to manufacture a ceramic block; and
forming a sealing material layer directly on a peripheral face of said ceramic block,
wherein
in said molding treatment, a stepped honeycomb molded body is manufactured, said stepped honeycomb molded body having a cell located at an outermost periphery of the honeycomb molded body in a shape virtually identical with a shape of a cell located at a place other than said outermost periphery of the honeycomb molded body and an outer wall of a virtually even thickness, said stepped honeycomb molded body being provided with a step on a part of said outer wall;
in said firing treatment, said stepped honeycomb molded body is fired to manufacture a stepped honeycomb fired body;
in said combining treatment, said stepped honeycomb fired body is placed so that a stepped outer wall of said stepped honeycomb fired body becomes a peripheral face of the ceramic block, to manufacture a ceramic block provided with a step on the peripheral face;
a surface of said sealing material layer is smooth; and
said sealing material layer does not have an irregularity formed on an outer peripheral face thereof.

18. The method for manufacturing a honeycomb structure according to claim 17, said method further comprising:
sealing either one end of each of said cells.

19. The method for manufacturing a honeycomb structure according to claim 17,
wherein
a shape of each of said cells is a rectangular shape.

20. The method for manufacturing a honeycomb structure according to claim 17,
wherein
a shape of each of said cells includes one of two or more kinds of shapes.

21. The method for manufacturing a honeycomb structure according to claim 20,
wherein
the shape of each of said cells includes one of an octagonal shape and a rectangular shape, and the octagonal shaped cell and the rectangular shaped cell are placed alternately.

22. The method for manufacturing a honeycomb structure according to claim 17,
wherein
the thickness of said peripheral wall of said stepped honeycomb fired body is thicker than the thickness of a cell wall other than the peripheral wall of said honeycomb fired body.

23. The method for manufacturing a honeycomb structure according to claim 17, further comprising:
in said combining treatment, manufacturing said ceramic block by combining three different shapes of honeycomb fired bodies.

24. The method for manufacturing a honeycomb structure according to claim 17,
wherein
the cells in said honeycomb fired bodies include: a cell having a cross-sectional shape of virtually hexagonal shape formed by cutting out a part from a virtually octagonal shape; and a cell having a cross-sectional shape of virtually pentagonal shape formed by cutting out a part from the cell having a cross-sectional shape of virtually hexagonal shape,
the virtually hexagonal-shaped cell being placed to an edge part in the cross section of each of said honeycomb fired bodies, and
the virtually pentagonal-shaped cell being placed to an apex part in the cross section of each of said honeycomb fired bodies.

25. The method for manufacturing a honeycomb structure according to claim 17,
wherein
the cells of said honeycomb fired bodies include cells having cross-sectional shapes of virtually quadrate, virtually octagon, virtually hexagon, and virtually pentagon.

26. The method for manufacturing a honeycomb structure according to claim 17,
wherein
the thickness of said cell wall is at least about 0.2 mm and at most about 0.4 mm.

27. The method for manufacturing a honeycomb structure according to claim 17,
wherein
the thickness of the outer wall included in each of said honeycomb fired bodies is at least about 0.2 mm and at most about 0.4 mm.

28. The method for manufacturing a honeycomb structure according to claim 17, said method further comprising:
forming said sealing material layer so that the step on said peripheral wall is filled with said sealing material layer.

29. The method for manufacturing a honeycomb structure according to claim 17,
wherein
a main component of a constituent material of said honeycomb fired bodies comprises silicon carbide or silicon-containing silicon carbide.

30. The method for manufacturing a honeycomb structure according to claim 17, said method further comprising:
supporting a catalyst on said honeycomb structure.

* * * * *

UNITED STATES PATENT AND TRADEMARK OFFICE
CERTIFICATE OF CORRECTION

PATENT NO. : 7,862,781 B2  
APPLICATION NO. : 12/047845  
DATED : January 4, 2011  
INVENTOR(S) : Kazushige Ohno, Masafumi Kunieda and Shigeharu Ishikawa It is certified that error appears in the above-identified patent and that said Letters Patent is hereby corrected as shown below:

In the Claims:  
Column 19, Line 13, Claim 1 the line should read as follows:  
step is provided;

Signed and Sealed this  
Twenty-second Day of March, 2011

David J. Kappos  
*Director of the United States Patent and Trademark Office*